(No Model.) 2 Sheets—Sheet 2.

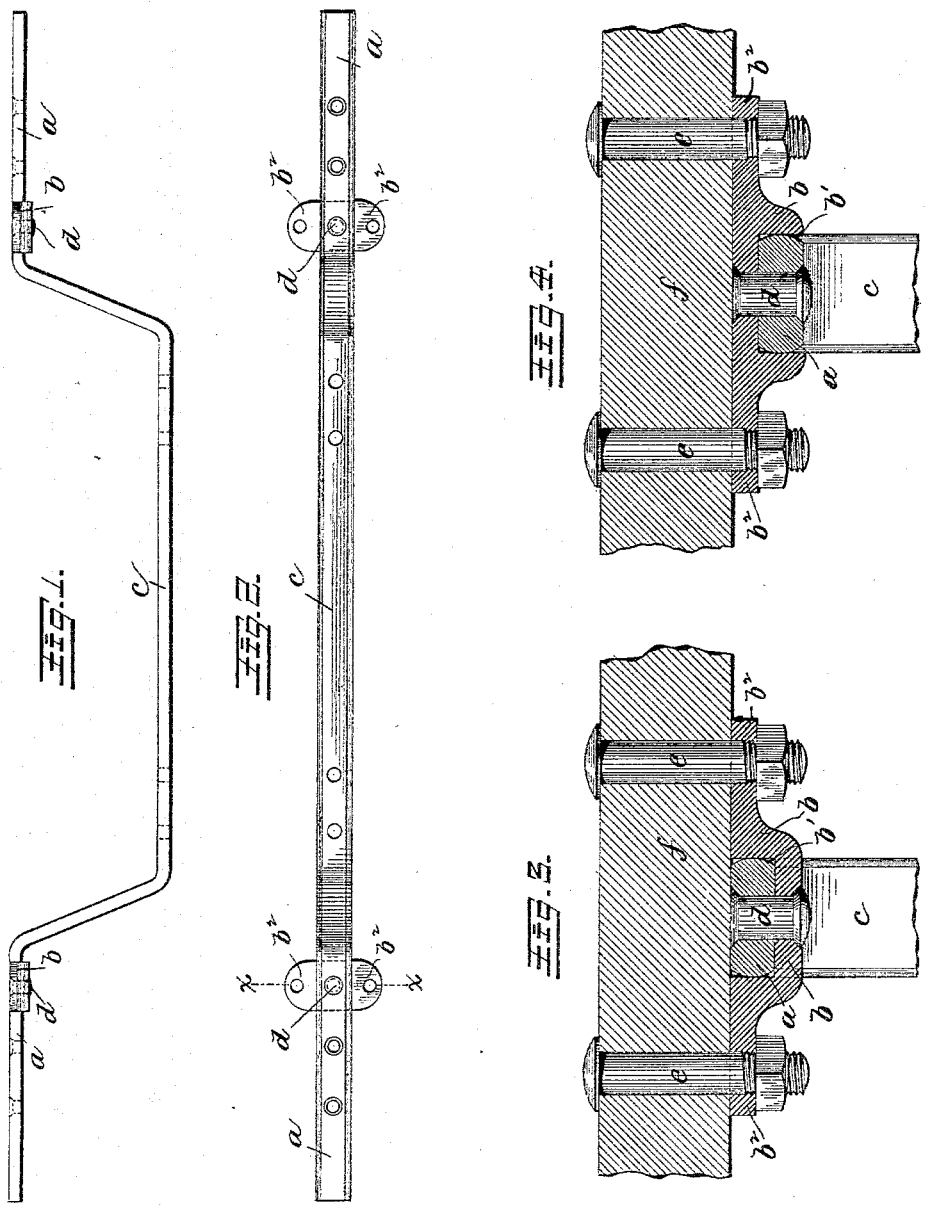

W. W. GRIER.
BODY BRACE FOR VEHICLES.

No. 356,935. Patented Feb. 1, 1887.

Witnesses
N. T. Corwin
H. L. Gill

Inventor.
William W. Grier
by Bakewell & Kerr
his Attorneys

UNITED STATES PATENT OFFICE.

WILLIAM W. GRIER, OF HULTON, PENNSYLVANIA.

BODY-BRACE FOR VEHICLES.

SPECIFICATION forming part of Letters Patent No. 356,935, dated February 1, 1887.

Application filed July 23, 1886. Serial No. 208,839. (No model.)

*To all whom it may concern:*

Be it known that I, WILLIAM W. GRIER, of Hulton, in the county of Allegheny and State of Pennsylvania, have invented a new and useful Improvement in Body-Braces for Vehicles; and I do hereby declare the following to be a full, clear, and exact description thereof, reference being had to the accompanying drawings, forming part of this specification, in which—

Figure 5:
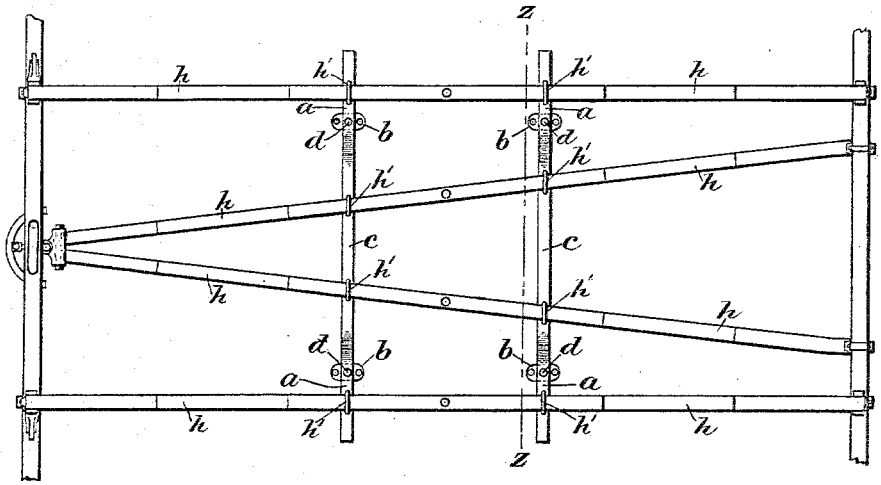
Figure 6:
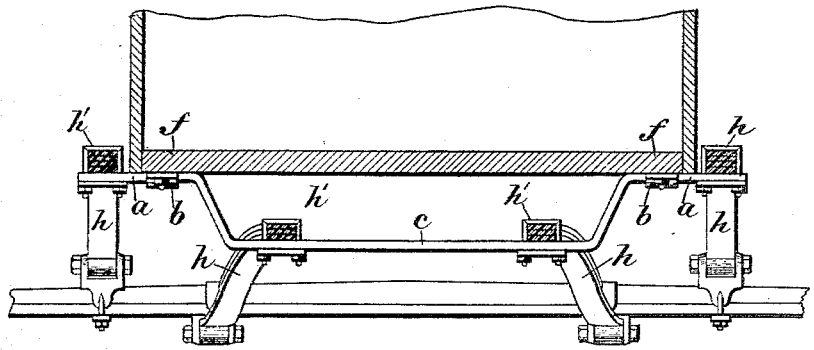

Figure 1 is a side view of a body-brace provided with my improvement. Fig. 2 is a top plan view thereof. Fig. 3 is an enlarged vertical cross-section on the line $x$ $x$ of Fig. 2, showing the manner of attaching the body-brace to the sill of the vehicle. Fig. 4 is a view similar to Fig. 3, showing a modification. Fig. 5 is a bottom plan view of the running-gear of a vehicle, showing the application of the body-brace; and Fig. 6 is a vertical cross-section through the gear and wagon-body on the line $z$ $z$ of Fig. 5.

Like symbols of reference indicate like parts in each.

Body-braces for vehicles to which my invention relates are iron or steel braces connecting the springs and body of vehicles which have longitudinal springs, and which, while they are of general utility wherever body-braces are required, are more especially adapted to that class of vehicles termed "no-perch" vehicles, wherein two sets of springs, arranged one above the other, are to be connected with each other and with the body of the vehicle by a rigid connection, so as to cause the springs to vibrate in unison. Their form is of a U shape, as shown in the drawings, having at their upper ends horizontal projecting arms $a$, which are provided near their extremities with holes for clip-bolts, which fasten them to the side bars or to the upper set of parallel springs, and at points farther in with ear-pieces or clasp-plates $b$, in which are holes for the passage of screws or bolts, by which the braces are fastened to the sills of the vehicle. This is shown in the figures on the second sheet of the drawings, in which $c$ $c$ represent the body-brace extending transversely underneath the wagon-body and fastened to the sills by the bolting-plates $b$; and $h$ are the vehicle-springs, which are supported by the body-braces, and are confined thereto by clips $h'$. The clasp-plates $b$ have heretofore been made integral with the brace itself, and when a given brace is not of proper size to fit a vehicle the brace must be cut and rewelded, so as to bring the plates $b$ to the proper positions; or, in other words, while the brace may be shortened at the ends and drilled for the spring-clips at any points which may be required by the position of the springs, there is no way to adjust the sill-plates except by cutting and welding. This is done by the carriage-makers, who receive the braces with the plates attached from the manufacturers, and it is very inconvenient, because the welding necessitates a degree of skill and quality of plant which carriage-makers would not otherwise need.

The purpose of my invention is to provide means whereby a body-brace as made by the manufacturer is capable of being easily fitted to vehicle-bodies of different widths and springs which are differently positioned.

To this end it consists, generally stated, in a body-brace, of substantially U form, adapted to combine two sets of springs, which are arranged in different horizontal planes, and to cause the coaction of said springs, and also in employing in conjunction therewith independent clasp-plates having grooves or recesses for the reception of the brace, which clasp-plates bind the body-brace to the body, and which plates may be adjusted on the brace and riveted thereto in fitting the body-brace to the vehicle to which it is subsequently applied.

Referring now to the drawings, $c$ is the middle part of the body-brace, and $a a$ are the horizontally-projecting arms before mentioned. The clasp-plate $b$ (see Figs. 3 and 4) is made separate from the brace, and consists of a metal plate with a central U-shaped groove, $b'$, and projecting wings or lug-plates $b^2$, in which are bolt-holes for securing the plate to the vehicle-sill $f$. The plate is adjusted to the brace at any desired point by fitting the groove $b'$ over the arm $a$ and securing the plate thereto preferably by a bolt or rivet, $d$, passing through a hole in the grooved part of the clasp-plate and through the arm $a$ of the brace. The clasp-plate is preferably set on the brace, as shown in Fig. 3, so that the grooved face of the plate shall be uppermost. In that case the strain of the bolts $e$, which fasten the side lugs of the plate to the sill, will tend to bend the upper edges of the groove over on the inclosed brace, and will thus clamp it very securely, assisting the rivet $d$ in holding it in place. The clasp-plates may, however, be set as shown in Fig. 4, with the uncovered side of the brace downward.

It will be clear to those skilled in the art that this clasp-plate is easily adjustable by the carriage-maker to fit bodies of varying width, and by dispensing with the necessity for cutting and welding the brace its use materially cheapens the cost and labor of manufacture.

It has heretofore been the practice to make so much of the brace as is adjacent to the springs $h$ and the parts $a$ of bar-iron which is rectangular in cross-section, and to make the remainder of the bar of oval form in cross-section. I have found, however, that a stronger and cheaper brace is had by making it of uniform cross-section throughout, the shape thereof being, as indicated in Figs. 2, 3, and 4, flat on the upper and lower surfaces and curved at the sides.

I claim—

1. A body-brace for no-perch vehicles of general U form and having horizontal arms, whereby it is adapted to connect two sets of springs arranged in different planes, in combination with independent detachable clasp-plates adapted to bind the brace rigidly to the body, substantially as and for the purposes specified.

2. The combination, with two sets of springs arranged in different horizontal planes and a bed or body, of a body-brace of general U form provided with horizontal arms $a$ and independent adjustable clasp-plates having grooves to embrace the horizontal arms of the body-brace and lugs or wings for attachment to the sill of the vehicle-body, substantially as and for the purposes specified.

3. The combination, with a vehicle-body brace, of a clasp-plate made separate from the brace and having a groove inclosing the brace, and a rivet or bolt which connects the plate and brace, substantially as and for the purposes specified.

In testimony whereof I have hereunto set my hand this 8th day of July, A. D. 1886.

WILLIAM W. GRIER.

Witnesses:
W. B. CORWIN,
THOMAS W. BAKEWELL.